(12) United States Patent
Pelletier et al.

(10) Patent No.: US 12,501,360 B2
(45) Date of Patent: *Dec. 16, 2025

(54) SYSTEMS AND METHODS FOR MANAGING COMMUNICATION BETWEEN DEVICES

(71) Applicant: KINETIC TECHNOLOGIES INTERNATIONAL HOLDINGS LP, Toronto (CA)

(72) Inventors: William Robert Pelletier, Campbell, CA (US); Brian B. North, Los Gatos, CA (US); Stephen E. Parks, Austin, TX (US)

(73) Assignee: Kinetic Technologies International Holdings LP, Toronto (CA)

( * ) Notice: Subject to any disclaimer, the term of this patent is extended or adjusted under 35 U.S.C. 154(b) by 419 days.

This patent is subject to a terminal disclaimer.

(21) Appl. No.: 18/094,218

(22) Filed: Jan. 6, 2023

(65) Prior Publication Data

US 2023/0164691 A1 May 25, 2023

Related U.S. Application Data

(63) Continuation of application No. 17/016,253, filed on Sep. 9, 2020, now Pat. No. 11,696,228, which is a
(Continued)

(51) Int. Cl.
*H04W 52/02* (2009.01)
*H04W 84/20* (2009.01)

(52) U.S. Cl.
CPC ........ *H04W 52/0212* (2013.01); *H04W 84/20* (2013.01); *Y02D 30/70* (2020.08)

(58) Field of Classification Search
CPC .......................... H04W 52/02; H04W 52/0203
(Continued)

(56) References Cited

U.S. PATENT DOCUMENTS 447,918 A 3/1891 Strowger
6,766,222 B1 7/2004 Duley
(Continued)

FOREIGN PATENT DOCUMENTS

CN 1436328 A 8/2003
CN 101208913 A 6/2008
(Continued)

OTHER PUBLICATIONS

First Office Action dated Jun. 7, 2023, issued in related Chinese Application No. 202110231161.1, with English machine translation (12 pages).
(Continued)

*Primary Examiner* — Robert J Lopata
(74) *Attorney, Agent, or Firm* — Sheppard Mullin Richter & Hampton LLP

(57) ABSTRACT

A system for managing power on distributed devices may include a first device having a master logic and a second device having a slave logic. The master logic may enable the first device to communicate with multiple devices having the slave logic on one or more channels. The slave logic may enable the second device having the slave logic to communicate with the first device and to communicate with a third device having the slave logic. The slave logic may enable the multiple devices having the slave logic to manage operations of the distributed devices.

17 Claims, 11 Drawing Sheets

Related U.S. Application Data continuation of application No. 16/266,458, filed on Feb. 4, 2019, now Pat. No. 10,798,653, which is a continuation of application No. 15/282,722, filed on Sep. 30, 2016, now Pat. No. 10,212,658.

(58) Field of Classification Search
USPC ........................................................ 370/329
See application file for complete search history.

(56) References Cited

U.S. PATENT DOCUMENTS

| | | | |
|---|---|---|---|
| 7,031,337 B2 | 4/2006 | Martin San Juan | |
| 7,430,259 B2 | 9/2008 | North et al. | |
| 7,877,208 B1* | 1/2011 | Battista | H04L 12/403 |
| | | | 701/490 |
| 7,913,012 B2* | 3/2011 | Piasecki | G06F 13/4208 |
| | | | 710/110 |
| 7,934,034 B2 | 4/2011 | Deshpande et al. | |
| 8,060,658 B2 | 11/2011 | McFarland | |
| 8,385,288 B2 | 2/2013 | Sridhara et al. | |
| 8,631,179 B1 | 1/2014 | Faulds et al. | |
| 9,880,950 B2 | 1/2018 | Sauer et al. | |
| 2002/0018513 A1 | 2/2002 | Curry et al. | |
| 2004/0123002 A1* | 6/2004 | Bennett | G06F 13/102 |
| | | | 710/74 |
| 2004/0139262 A1* | 7/2004 | Beaudoin | G06F 13/426 |
| | | | 710/305 |
| 2004/0208200 A1* | 10/2004 | Hejdeman | H04L 12/403 |
| | | | 370/461 |
| 2006/0092858 A1* | 5/2006 | Kynast | H04L 12/403 |
| | | | 370/254 |
| 2006/0114943 A1* | 6/2006 | Kynast | H04L 12/437 |
| | | | 370/509 |
| 2007/0291887 A1* | 12/2007 | Ishimoto | H04L 25/40 |
| | | | 375/371 |
| 2008/0059671 A1* | 3/2008 | Blumcke | H04L 12/403 |
| | | | 710/110 |
| 2009/0144471 A1* | 6/2009 | Lin | G06F 13/4252 |
| | | | 710/110 |
| 2009/0157930 A1* | 6/2009 | Kuo | G06F 13/4022 |
| | | | 710/110 |
| 2009/0240859 A1 | 9/2009 | Hsieh | |
| 2009/0248216 A1* | 10/2009 | McKim, Jr. | G06F 1/305 |
| | | | 703/2 |
| 2009/0292840 A1 | 11/2009 | Konnail et al. | |
| 2010/0260085 A1* | 10/2010 | Wang | H04W 74/02 |
| | | | 370/311 |
| 2010/0312934 A1 | 12/2010 | Chi et al. | |
| 2011/0029705 A1 | 2/2011 | Evans | |
| 2011/0069697 A1* | 3/2011 | Sim | H04W 16/14 |
| | | | 370/350 |
| 2011/0176503 A1 | 7/2011 | Patel et al. | |
| 2011/0197001 A1* | 8/2011 | Hsieh | G06F 13/42 |
| | | | 710/110 |
| 2012/0057508 A1* | 3/2012 | Moshfeghi | H04B 1/0064 |
| | | | 375/222 |
| 2012/0083902 A1 | 4/2012 | Daum et al. | |
| 2012/0084378 A1* | 4/2012 | Kaneko | H04L 12/4035 |
| | | | 709/208 |
| 2012/0191889 A1* | 7/2012 | Fischer | G06F 13/4291 |
| | | | 710/110 |
| 2012/0233368 A1 | 9/2012 | Alshinnawi et al. | |
| 2012/0243559 A1* | 9/2012 | Pan | H04J 3/1605 |
| | | | 370/503 |
| 2012/0284429 A1 | 11/2012 | Adkins et al. | |
| 2013/0095888 A1 | 4/2013 | Chapman | |
| 2013/0282941 A1* | 10/2013 | van Dijk | H04L 61/5038 |
| | | | 710/110 |
| 2013/0297829 A1 | 11/2013 | Berenbaum et al. | |
| 2013/0325994 A1* | 12/2013 | Chai | H04L 67/1097 |
| | | | 709/208 |
| 2014/0029172 A1* | 1/2014 | Yoo | H02J 1/10 |
| | | | 361/679.01 |
| 2014/0047056 A1 | 2/2014 | Tahara et al. | |
| 2014/0047132 A1 | 2/2014 | Sip | |
| 2014/0203758 A1 | 7/2014 | Moshfeghi | |
| 2014/0245808 A1* | 9/2014 | Pradhan | G01L 27/002 |
| | | | 73/1.08 |
| 2015/0019778 A1 | 1/2015 | Calvin et al. | |
| 2015/0026374 A1* | 1/2015 | Decesaris | G06F 13/40 |
| | | | 710/110 |
| 2015/0095536 A1* | 4/2015 | Lee | G06F 13/4291 |
| | | | 710/110 |
| 2015/0095537 A1 | 4/2015 | Sengoku | |
| 2015/0242348 A1* | 8/2015 | Levy | G06F 1/04 |
| | | | 710/110 |
| 2015/0271825 A1* | 9/2015 | Takahashi | H04W 8/005 |
| | | | 370/329 |
| 2015/0304884 A1* | 10/2015 | Katayama | H04W 74/085 |
| | | | 370/338 |
| 2016/0034417 A1* | 2/2016 | Chavez | G05B 19/4185 |
| | | | 710/110 |
| 2016/0205066 A1* | 7/2016 | Attarwala | H04L 61/5038 |
| | | | 709/208 |
| 2016/0232122 A1* | 8/2016 | Margabandu | G06F 13/00 |
| 2016/0269828 A1* | 9/2016 | Smith | H04R 3/14 |
| 2016/0292106 A1 | 10/2016 | Spiegel et al. | |
| 2016/0294544 A1* | 10/2016 | Jang | H04B 1/16 |
| 2016/0379659 A1* | 12/2016 | Negi | H04L 25/49 |
| | | | 381/74 |
| 2017/0041127 A1* | 2/2017 | Sharpe-Geisler | G06F 13/4291 |
| 2017/0060791 A1* | 3/2017 | Huh | G06F 13/36 |
| 2017/0109305 A1* | 4/2017 | Liu | G06F 13/4282 |
| 2017/0169976 A1* | 6/2017 | Kanner | B60T 13/665 |
| 2017/0308487 A1* | 10/2017 | Oda | G06F 13/1673 |
| 2017/0346308 A1* | 11/2017 | Kain | H02J 13/00017 |
| 2017/0359195 A1* | 12/2017 | Bender | H04L 12/40006 |
| 2018/0098278 A1 | 4/2018 | Pelletier et al. | |
| 2018/0203818 A1* | 7/2018 | Fukuda | G05B 15/02 |
| 2019/0121335 A1* | 4/2019 | Yoneda | G05B 19/0405 |
| 2019/0123828 A1* | 4/2019 | Hellström | G06F 13/4063 |
| 2019/0278733 A1* | 9/2019 | Kessler | H04B 3/548 |
| 2020/0033396 A1* | 1/2020 | Feucht | G01R 31/2806 |
| 2022/0335002 A1 | 10/2022 | Li et al. | |

FOREIGN PATENT DOCUMENTS

| | | |
|---|---|---|
| CN | 102007755 A | 4/2011 |
| CN | 102088386 A | 6/2011 |
| CN | 102124797 A | 7/2011 |
| CN | 103250353 A | 8/2013 |
| CN | 103345845 A | 10/2013 |
| CN | 203299573 U | 11/2013 |
| CN | 105511340 A | 4/2016 |
| EP | 0709949 A2 | 5/1996 |
| EP | 2589158 A1 | 5/2013 |
| GB | 0017531 | 9/2000 |
| WO | 2012/001333 A1 | 1/2012 |

OTHER PUBLICATIONS

Second Office Action dated Nov. 27, 2023, issued in related Chinese Application No. 202110231161.1, with English machine translation (14 pages).

Supplementary Search dated Mar. 15, 2024, issued in related Chinese Application No. 202110231161.1.

Third Office Action dated Mar. 15, 2024, issued in related Chinese Application No. 202110231161.1, with English machine translation (12 pages).

PCT International Preliminary Report on Patentability mailed Jul. 18, 2019, issued in related International Application No. PCT/US2017/068524 (9 pages).

PCT International Search Report and the Written Opinion mailed Nov. 24, 2017, issued in related International Application No. PCT/US2017/053602 (11 pages).

Non-Final Office Action dated May 14, 2018, issued in related U.S. Appl. No. 15/282,722 (15 pages).

Notice of Allowance dated Oct. 9, 2018, issued in related U.S. Appl. No. 15/282,722 (10 pages).

(56) References Cited

OTHER PUBLICATIONS

First Search and Office Action dated Feb. 3, 2020, issued in related Chinese Application No. 201780060575.4, with English machine translation (26 pages).
Notice of Allowance dated Dec. 13, 2019, issued in related Korean Patent Application No. 10-2019-7012420, with English machine translation (3 pages).
Notice to Submit Response (Office Action) dated Aug. 12, 2019, issued in related Korean Patent Application No. 10-2019-7012420, with English machine translation (5 pages).
Non-Final Office Action dated Dec. 4, 2019, issued in related U.S. Appl. No. 16/266,458 (14 pages).
Non-Final Office Action dated Feb. 17, 2022, issued in related U.S. Appl. No. 16/933,250 (11 pages).
Fundamentals of Telephone Communication Systems, Western Electric, Available at http://etler.com/docs/WECo/Fundamentals/, Specifically, Chapter 4 on Step-by-Step Switches (Year: 1969).
Bigelow et al., "Understanding Telephone Electronics" (Year: 2001).
https://web.archive.org Wikipedia web page on Pulse Dialing, http://en.wikipedia.org/wiki/Pulse_dialing Nov. 8, 2016 (Year: 2016).
Non-Final Office Action dated Nov. 9, 2018, issued in corresponding U.S. Appl. No. 15/399,526 (12 pages).
Final Office Action dated Apr. 2, 2019, issued in corresponding U.S. Appl. No. 15/399,526 (15 pages).
Notice of Allowance dated Apr. 16, 2020, issued in corresponding U.S. Appl. No. 15/399,526 (10 pages).
PCT International Search Report and the Written Opinion mailed Feb. 26, 2018, in related International Application No. PCT/US2017/068524 (10 pages).
PCT International Preliminary Report on Patentability mailed May 16, 2019, in related International Application No. PCT/US2017/053602 (10 pages).
Second Office Action dated Aug. 7, 2020, issued in related Chinese Application No. 201780060575.4, with English machine translation (8 pages).
Notification of Reason for Refusal dated Jan. 28, 2021, issued in related Korean Application No. 10-2020-7007491, with English machine translation (17 pages).
Notice of Allowance dated Jun. 8, 2020, issued in corresponding U.S. Appl. No. 16/266,458 (9 pages).
Notice of Allowance dated May 4, 2022, issued in corresponding U.S. Appl. No. 16/933,250 (11 pages).
Non-Final Office Action dated Jan. 10, 2022, issued in corresponding U.S. Appl. No. 17/016,253 (33 pages).
Final Office Action dated Jul. 21, 2022, issued in corresponding U.S. Appl. No. 17/016,253 (29 pages).
Notice of Allowance dated Sep. 23, 2022, issued in corresponding U.S. Appl. No. 17/016,253 (10 pages).
First Search dated May 30, 2023, issued in related Chinese Patent Application No. 202110231161.1 (3 pages).
Notice of Allowance mailed Feb. 15, 2023, issued in related U.S. Appl. No. 17/016,253 (10 pages).
Notice of Allowance mailed Jan. 19, 2023, issued in related U.S. Appl. No. 17/887,365 (12 pages).

* cited by examiner

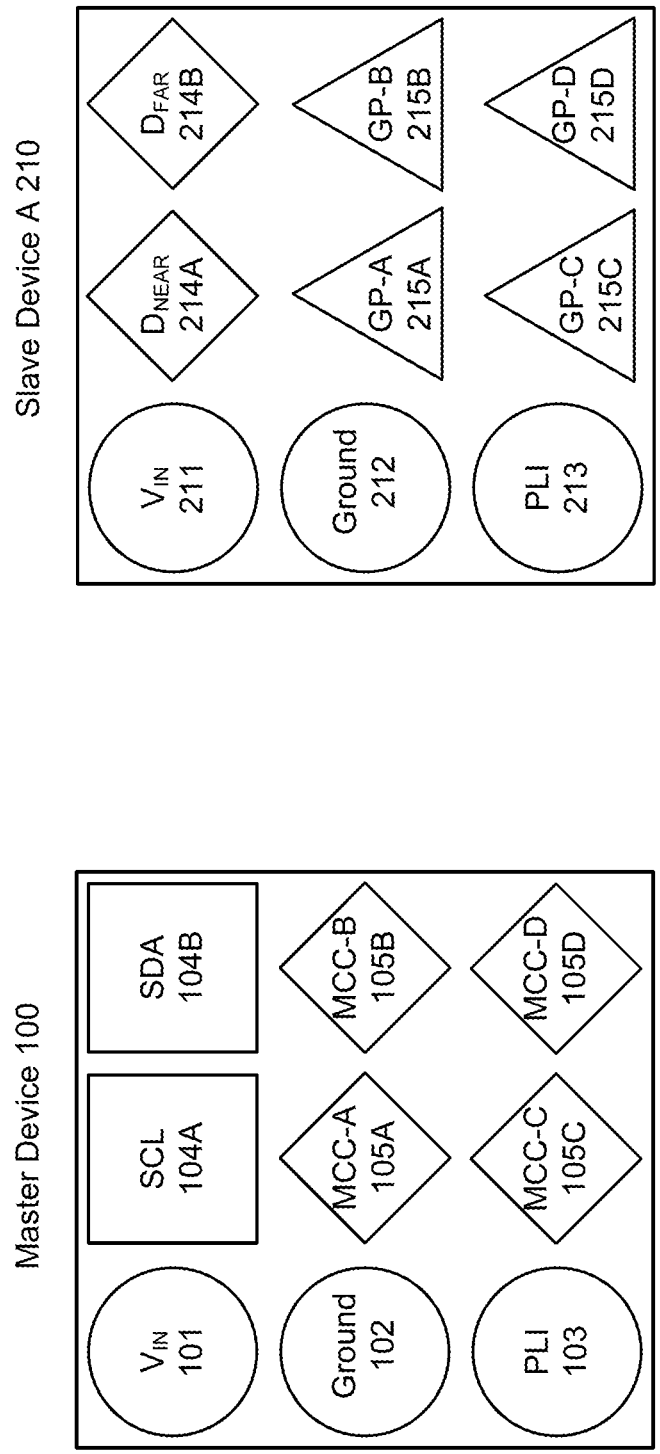

SYSTEMS AND METHODS FOR MANAGING COMMUNICATION BETWEEN DEVICES

CROSS REFERENCE TO RELATED APPLICATIONS

The present application is a continuation of U.S. patent application Ser. No. 17/016,253, filed on Sep. 9, 2020, and entitled "Systems and Methods for Managing Communication Between Devices," which is a continuation of U.S. patent application Ser. No. 16/266,458, filed on Feb. 4, 2019, now U.S. Pat. No. 10,798,653, and entitled "Systems and Methods for Managing Communication Between Devices," which is a continuation of and claims priority to U.S. patent application Ser. No. 15/282,722, filed on Sep. 30, 2016, now U.S. Pat. No. 10,212,658, and entitled "Systems and Methods for Managing Communication Between Devices". The above-referenced applications are hereby incorporated by reference in their entirety.

TECHNICAL FIELD

This disclosure relates to generally to operations of distributed devices, and more specifically to the management of power on distributed devices.

BACKGROUND

Electrically powered devices may have different power requirements and different operating requirements. A single point of interface for managing power on multiple electrically powered devices may facilitate their use.

SUMMARY

This disclosure relates to the management of power on distributed devices. A system for managing power on distributed devices may include a first device having a master logic and a second device having a slave logic. The master logic may enable the first device to communicate with multiple devices having the slave logic on one or more channels. The slave logic may enable the second device having the slave logic to communicate with the first device and to communicate with a third device having the slave logic. The slave logic may enable the multiple devices having the slave logic to manage operations of the distributed devices.

The first device may have the master logic. The first device may include one or more single master channel connectors, a master data connector, and/or other connectors. The master logic may enable the first device to communicate with multiple devices having the slave logic on one or more channels. In some implementations, the master logic may enable the first device to communicate with the multiple devices having the slave logic on up to four, eight, sixteen, thirty-two, or sixty-four channels. The first device may communicate with one or more devices having the slave logic on a single channel via a single master channel connector of the first device. In some implementations, the master logic may enable the first device to receive a signal sent on the single channel via another single master channel connector of the first device.

The master logic may enable the first device to communicate with a processor via the master data connector. In some implementations, the master data connector may include an inter-integrated circuit connector and/or other connectors.

The second device may have the slave logic. The second device may include two or more slave channel connectors, one or more slave input-output connectors, and/or other connectors. In some implementations, the one or more slave input-output connectors may include up to four, eight, sixteen, thirty-two, or sixty-four points of connections.

The slave logic may enable the second device to communicate with the first device on the single channel via a first slave channel connector of the second device. The slave logic may enable the second device to communicate with the third device having the slave logic. The slave logic may enable the second device to communicate with the third device on the single channel via a second slave channel connector of the second device.

The third device may have the slave logic. The third device may include two or more slave channel connectors and/or other connectors. The slave logic may enable the third device to communicate with the second device on the single channel via a third slave channel connector of the third device. The slave logic may enable the third device to communicate with a fourth device having the slave logic. The slave logic may enable the third device to communicate with the fourth device on the single channel via a fourth slave channel connector of the third device.

The slave logic may enable to the second device to manage operations of one or more of the distributed devices via the one or more slave input-output connectors. In some implementations, one or more of the distributed devices may include one or more power devices or one or more sensing devices. In some implementations, the second device may be a part of a power device or a sensing device. The slave logic may enable the second device to send and/or receive one or more analog signals and/or one or more digital signals via the one or more slave input-output connectors. One or more analog signals may include a voltage signal, a current signal, an analog data signal, and/or other analog signals. One or more digital signals may include a digital command signal, a digital data signal, and/or other digital signals.

In some implementations, one or more addresses of the multiple devices having the slave logic may be determined based on pulse shaving. Pulse shaving may determine the one or more address of the multiple devices based on a number of pulses counted by the multiple devices.

A configurable device may be provided for managing power on distributed devices. The configurable device may include the master logic and the slave logic. The configurable device may be configured in a master mode or a slave mode. In some implementations, the configurable device may be reconfigurable between the master mode and the slave mode. In some implementations, the configurable device may be configurable once in the master mode or the slave mode.

The master logic may enable the configurable device configured in the master mode to communicate with multiple devices on one or more channels. The multiple devices may have the slave logic. The configurable device configured in the master mode may communicate with one or more devices having the slave logic on a single channel via a single master channel connector of the configurable device.

The slave logic may enable the configurable device configured in the slave mode to communicate with a master device having the master logic, communicate with a slave device having the slave logic on the single channel, and manage operations of one or more distributed devices. The configurable device configured in the slave mode may communicate with the master device on the single channel via a first slave channel connector of the configurable device. The configurable device configured in the slave mode may communicate with the slave device on the single channel via a second slave channel connector of the configurable device. The configurable device configured in the slave mode may manage operations of one or more of the distributed devices via one or more slave input-output connectors of the configurable device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

FIG. 2A illustrates an exemplary master device for managing power on distributed devices in accordance with some implementations of the disclosure.

FIG. 2B illustrates an exemplary slave device for managing power on distributed devices in accordance with some implementations of the disclosure.

DETAILED DESCRIPTION

Figure 1A:
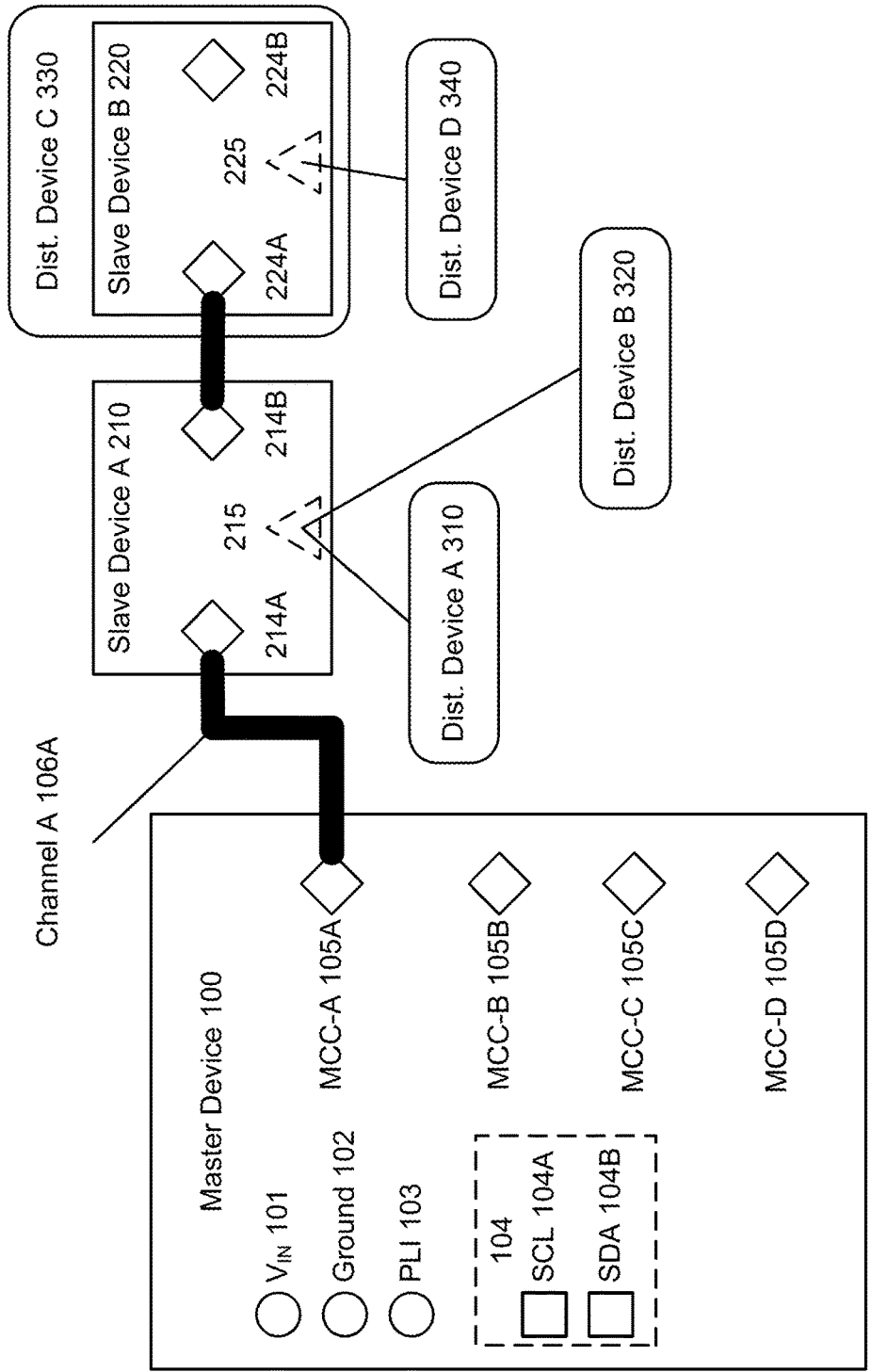
FIGS. 1A-1B illustrate exemplary system for managing power on distributed devices in accordance with some implementations of the disclosure.

FIG. 1A illustrates exemplary system 10 for managing power on distributed devices. System 10 may include master device 100 and one or more slave devices (e.g., slave device A 210, slave device B 220). Master device 100 may have a master logic and slave devices 210, 220 may have a slave logic. The master logic may enable master device 100 to communicate with multiple slave devices 210, 220 having the slave logic on one or more channels (e.g., channel A 106A). The slave logic may enable slave device A 210 to communicate with master device 100 and to communicate with slave device B 220. The slave logic may enable slave devices 210, 220 to manage operations of one or more of the distributed devices (e.g., 310, 320, 330, 340). Distributed devices 310, 320, 330, 340 may refer to devices that require power to operate. One or more of distributed devices 310, 320, 330, 340 may change the delivery of power to other devices. One or more components of system 10 may be configured to perform one or more steps of method 700 described below with reference to FIG. 7.

Master device 100 may provide a single point of interface for managing power on distributed devices 310, 320, 330, 340. Master device 100 may have the master logic and/or other logics. Master device 100 may include one or more connectors. A connector may refer to one or more hardware and/or software that enables connections between two or more devices. A connector may enable wired and/or wireless connections between two or more devices. As non-limiting examples, a connector may include one or more of a male connector, a female connector, a conductor, a pin, a socket, a node, an access point, and/or other connectors. As non-limiting examples, a wireless connector may enable one or more of radio connection, Bluetooth connection, Wi-Fi connection, cellular connection, infrared connection, optical connection, or other wireless connections.

Referring to FIGS. 1A and 2A, master device 100 may include some or all of the following connectors: $V_{IN}$ 101, Ground 102, PLI 103, a set of master data connectors 104 (e.g., SCL 104A, SDA 104B), a set of single master channel connectors 105 (e.g., MCC-A 105A, MCC-B 105B, MCC-C 105C, MCC-D 105D). $V_{IN}$ 101 may enable connection between master device 100 and a power source. Ground 102 may enable connection between master device 100 and a ground. PLI 103 may refer to a power loss interrupt connector (described herein). Master device 100 may include other connectors. Master device 100 may include other components not shown in FIGS. 1A and 2A. For example, master device 100 may include one or more of a processor, a memory (volatile and/or non-volatile), internal and external connections, and/or other components.

The master logic may enable master device 100 to communicate with multiple devices having the slave logic on one or more channels. For example, the master logic may enable master device 100 to communicate with slave device A 210, slave device B 220, and/or other slave devices on channel A 106A. Master device 100 may communicate with slave device A 210, slave device B 220, and/or other slave devices on channel A 106A via a single master channel connector (MCC-A 105A) of master device 100. In some implementations, the master logic may enable master device 100 to communicate with multiple devices having the slave logic on up to four, eight, sixteen, thirty-two, sixty-four, or other channel numbers of powers of two. Other numbers of channels are contemplated.

The communication between master device 100 and one or more of slave device A 210, slave device B 220, and/or other slave devices on channel A 106A may be clockless. The communication between master device 100 and one or more of slave device A 210, slave device B 220, and/or other slave devices on channel A 106A may be bidirectional. For example, slave device A 210 and/or slave device B 220 may report on their operating status (e.g., schedule reports or unscheduled/emergency reports/fault reporting) and/or address to master device 100 via communication on channel A 106A. In some implementations, the communication on channel A 106A may include 16-bit commands, comprised of 4-bit unit address, 4-bit register address, and 8-bit command data. Other sizes of commands are contemplated.

The communication from master device 100 may include individual communications including commands addressed to individual slave devices and/or may include combined communications including multiple command addressed to multiple slave devices. The communication on channel A 106A may follow one or more industry protocols/standards or follow other protocols/standards. In some implementations, communications between master device 100 and one or more slave devices may use a power-line communication protocol.

Communication on one or more channels may be implemented via a closed-gate configuration or an open-gate configuration. In a closed-gate configuration, the connections between devices on a channel may be established and communications on the channel may be available to all devices connected to the channel. The communications on the channel may be available to all devices connected to the channel simultaneously or nearly simultaneously. For example, in FIG. 1A, the connection between master device 100 and slave device A 210 and the connection between slave device A 210, slave device B 220 may be established and communications from master device 100 on channel A 106A may be available to both slave device A 210 and slave device B 220. Establishing the connections between the devices on a channel may effectively create a bus that allows all slave devices on the channel to receive (for a period of time) communications from master device 100 or communications from one or more slave devices. The connections between the devices on a channel may be established after the addresses of the individual devices on the channel have been determined (e.g., via pulse shaving or other addressing methods).

In an open-gate configuration, one or more connections between devices on a channel may be open and communications on the channel may be relayed to one or more devices on the channel. For example, in FIG. 1A, the connection between slave device A 210 and slave device B 220 may be open and communication from master device 100 may not be available directly to slave device B 220 until the connection between slave device A 210 and slave device B 220 is established. Based on a communication from master device 100 being directed to slave device B 220, the communication from master device 100 may be buffered in memory of slave device A 210. The connection between slave device A 210 and slave device B 220 may be established and the communication stored in the memory of slave device A 210 may be sent to slave device B 220.

Figure 1B:
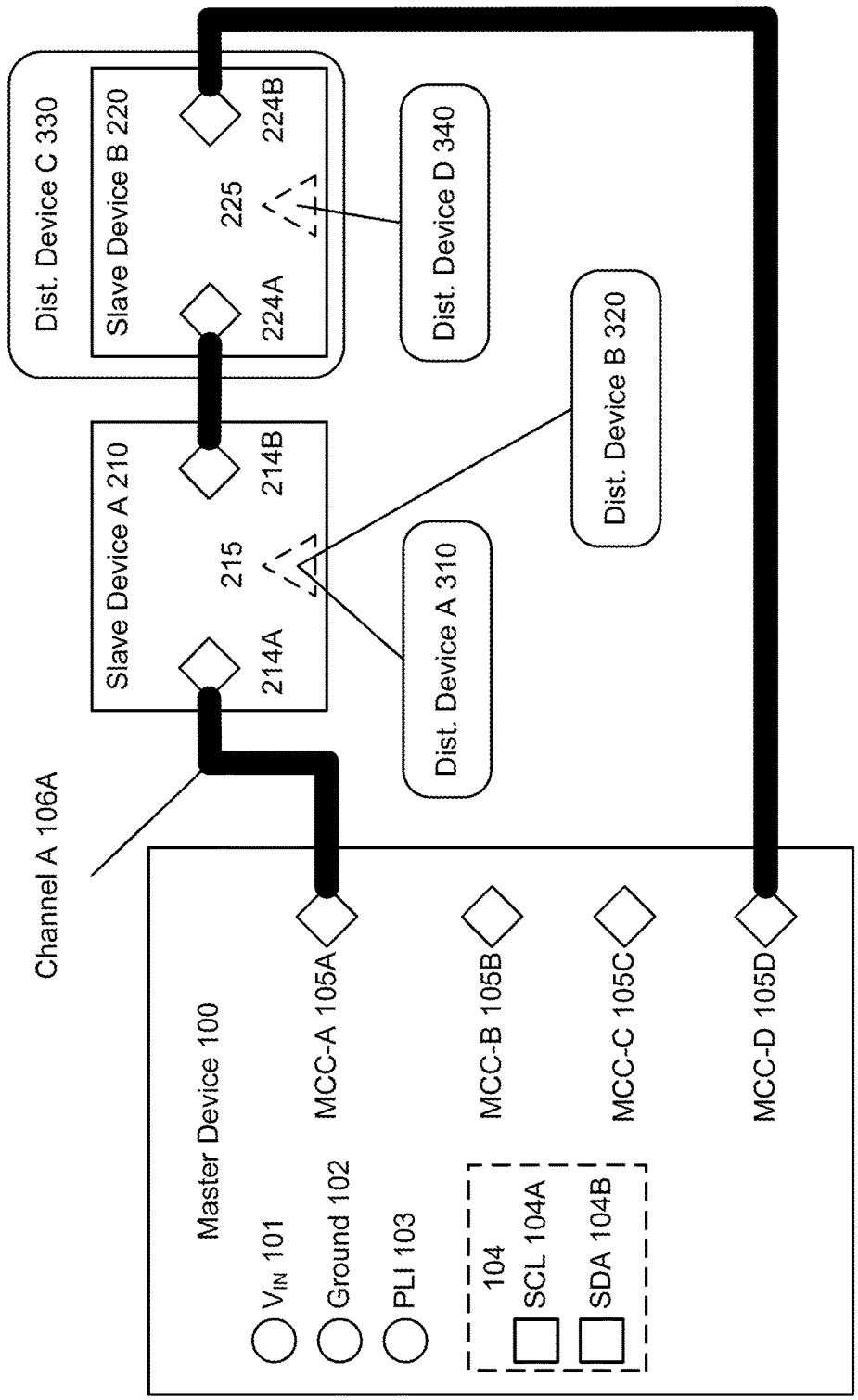

In some implementations, the master logic may enable master device 100 to receive a signal sent on a single channel via another single master channel connector of master device 100. Such configuration may be referred to as a dual-pin configuration. An exemplary dual-pin configuration is shown in FIG. 1B. In FIG. 1B, connections of master device 100 to channel A 106A may include a single master channel connector (MCC-A 105A) of master device 100 and another single master channel connector (MCC-D 105D) of master device 100.

In some implementations, communications on channel A 106A may proceed in a clockwise manner. For example, a signal sent by master device 100 may travel from a single master channel connector (MCC-A 105A) of master device 100 to a first slave channel connector 214A of slave device A 210, from a second slave channel connector 214B of slave device A 210 to a first slave channel connector 224A of slave device B 220, from a second slave channel connector 224B of slave device B 220 to another single master channel connector (MCC-D 105D) of master device 100.

In some implementations, communications on channel A 106A may proceed in a counter-clockwise manner. For example, a signal sent by master device 100 may travel from a single master channel connector (MCC-D 105D) of master device 100 to the second slave channel connector 224B of slave device B 220, from the first slave channel connector 224A of slave device B 220 to the second slave channel connector 214B of slave device A 210, from the first slave channel connector 214A of slave device A 210 to another single master channel connector (MCC-A 105A) of master device 100.

A dual-pin configuration may provide a loop-back path for redundant communication paths. For example, if the connection between master device 100 and slave device A 210 is broken, master device 100 may communicate with slave device B 220 via MCC-D 105D. A dual-pin configuration of system 10 may provide a return path for check on communications on channel A 106A. For example, master device 100 may send a signal on MCC-A 105A and receive the signal via MCC-D 105D. The signal sent on MCC-A 105A may be compared with the signal received on MCC-D 105D to confirm that the signal was not altered during transmission or altered as expected during transmission.

The master logic may enable master device 100 to communicate with a processor (e.g., SSD controller, system controller, microcontroller, CPU, GPU, application specific standard product) via set of master data connectors 104. Communication between the processor and master device 100 may allow for monitoring and/or controlling of slave devices and/or distributed devices by the processor. Set of master data connectors 104 may include one or more connectors that allows master device 100 to send and/or receive information regarding operations of slaves devices (e.g., slave device A 210, slave device B 220) and/or distributed devices (e.g., distributed devices 310, 320, 330, 340). In some implementations, master device 100 may be part of a device containing the processor or may be part of the processor. In such a case, set of master data connectors 104 may be effectuated via software and/or internal hardware of the device/processor (e.g., connections made on a circuit board, connections made in silicon, logical programming of the processor).

The communication between the processor and master device 100 may follow one or more industry protocols/standards. For example, set of master data connectors 104 may include an inter-integrated circuit connector (e.g., SCL 104A, SDA 104B) and/or other connectors. The processor may receive from and/or send to master device 100 information regarding slave devices and/or distributed devices via communication that follows the inter-integrated circuit protocol. Uses of other types of protocols/standards that allow for communication between master device 100 and a processor are contemplated.

A slave device may provide a single point of interface for managing power on one or more distributed devices. For example, slave device A 210 may provide a single point of interface for managing power on distributed device A 310 and distributed device B 320, and slave device B 220 may provide a single point of interface for managing power on distributed device C 330 and distributed device D 340. Slave devices (e.g., slave device A 210, slave device B 220) may have the slave logic and/or other logics. Slave devices may include one or more connectors.

Referring to FIGS. 1A and 2B, slave device A 210 may include some or all of the following connectors: $V_{IN}$ 211, Ground 212, PLI 213, a set of slave channel connectors 214 (e.g., first slave channel connector/$D_{NEAR}$ 214A, second slave channel connector/$D_{FAR}$ 214B), a set of slave input-output connectors 215 (e.g., GP-A 215A, GP-B 215B, GP-C 215C, GP-D 215D). $V_{IN}$ 211 may enable connection between slave device A 210 and a power source. Ground 212 may enable connection between slave device A 210 and a ground. PLI 213 may refer to a power loss interrupt connector (described herein). Although set of slave input-output connectors 215 are shown to include four points of connections (GP-A 215A, GP-B 215B, GP-C 215C, GP-D 215D) in FIG. 2B, this is illustrative and not limiting. Set of slave input-output connectors 215 may include up to four, eight, sixteen, thirty-two, sixty-four, or other points of connections of powers of two. Other numbers of points of connections are contemplated. Slave device A 210 may include other connectors. Slave device B 210 may include some or all of the connectors described for slave device A 210.

A slave device may include other components not shown in FIGS. 1A and 2B. For example, slave device A 210 and/or slave device B 220 may include one or more of a processor, a memory (volatile and/or non-volatile), internal and external connections, and/or other components. Different slave devices may include the same components. For example, different slave devices may include one kilobyte of non-volatile memory. Different slave devices may include different components. For example, different slave devices may include non-volatile memory of different sizes. Some slave devices may include non-volatile memory while other slave devices may not include non-volatile memory.

The slave logic may enable slave device A 210 to communicate with master device 100 on channel A 106A. Slave device A 210 may communicate with master device 100 on channel A 106A via first slave channel connector/$D_{NEAR}$ 214A of slave device A 210. The slave logic may enable slave device A 210 to communicate with slave device B 220 having the slave logic. The slave logic may enable slave device A 210 to communicate with slave device B 220 on channel A 106A via second slave channel connector/$D_{FAR}$ 214B of slave device A 210.

The slave logic may enable slave device B 220 to communicate with slave device A 210 on channel A 106A via first slave channel connector/$D_{NEAR}$ 224A of slave device B 220. The slave logic may enable slave device B 220 to communicate with another slave device on channel A 106A via second slave channel connector/$D_{FAR}$ 224B of slave device B 220. Referring to FIG. 1B, the slave logic may enable slave device B 220 to communicate with master device 100 via second slave channel connector/$D_{FAR}$ 224B of slave device B 220.

The slave logic may enable to slave device A 210 to manage operations of distributed device A 310 and/or distributed device B 320 via the set of slave input-output connectors 215. The slave logic may enable to slave device B 220 to manage operations of distributed device C 330 and/or distributed device D 340 via the set of slave input-output connectors 225. While FIG. 1A shows a single connection line between sets of slave input-output connectors 215, 225 and individual distributed devices 310, 320, 340, this is merely for ease of reference and is not limiting. Connections between sets of slave input-output connectors 215, 225 and individual distributed devices 310, 320, 340 may include one or multiple connections.

In some implementations, one or more distributed devices 310, 320, 330, 340 may include one or more power devices or one or more sensing devices. Power devices may refer to devices that change/control the delivery of power to other devices. As non-limiting examples, power devices may include a step-down converter, a step-up converter, a load switch, a power loss protector, an amplifier, a voltage regulator, a current regulator, an AC-to-DC converter, a DC-to-AC converter, a linear regulator and/or other power devices. Sensing devices may refer to devices that monitor the operating conditions of one or more devices. As non-limiting examples, sensing devices may monitor one or more of temperature, voltage, current, fan speed, air flow, power, power factor, battery level, light level/color, and/or other operating conditions.

In some implementations, a slave device may be part of a distributed device, such as a power device or a sensing device. For example, slave device B 220 may be part of distributed device C 330. Distributed device C 330 may implement the slave logic of slave devices. In such a case, some or all of the set of slave input-output connectors 225 may be effectuated via software and/or internal hardware of distributed device C 330 (e.g., connections made on a circuit board, connections made in silicon, logical programming of the distributed device C 330). Distributed device C 330 may include slave input-output connectors 225 that allows distributed device C 330 to manage operations of distributed device D 340.

The slave logic may enable a slave device to send and/or receive one or more analog signals and/or one or more digital signals via one or more slave input-output connectors. One or more analog signals may include a voltage signal, a current signal, an analog data signal, and/or other analog signals. One or more digital signals may include a digital command signal, a digital data signal, and/or other digital signals. For example, the slave logic may enable slave device A 210 to send and/or receive analog signals and/or digital signals to distributed device A 310 and/or distributed device B 320 via set of slave input-output connectors 215. The slave logic may enable slave device B 220 to send and/or receive analog signals and/or digital signals to distributed device C 330 and/or distributed device D 340 via set of slave input-output connectors 225. In some implementations, the slave logic may enable a slave device to send and/or receive one or more signals using pulse width modulation. For example, the slave logic may enable slave device B 220 to send and/or receive signals using pulse width modulation via set of slave input-output connectors 225. Pulse width modulation may include non-synchronous pulse width modulation using a single connection of set of slave input-output connectors 225 or synchronous modulation using multiple connections of set of slave input-output connectors 225.

Figure 3A:
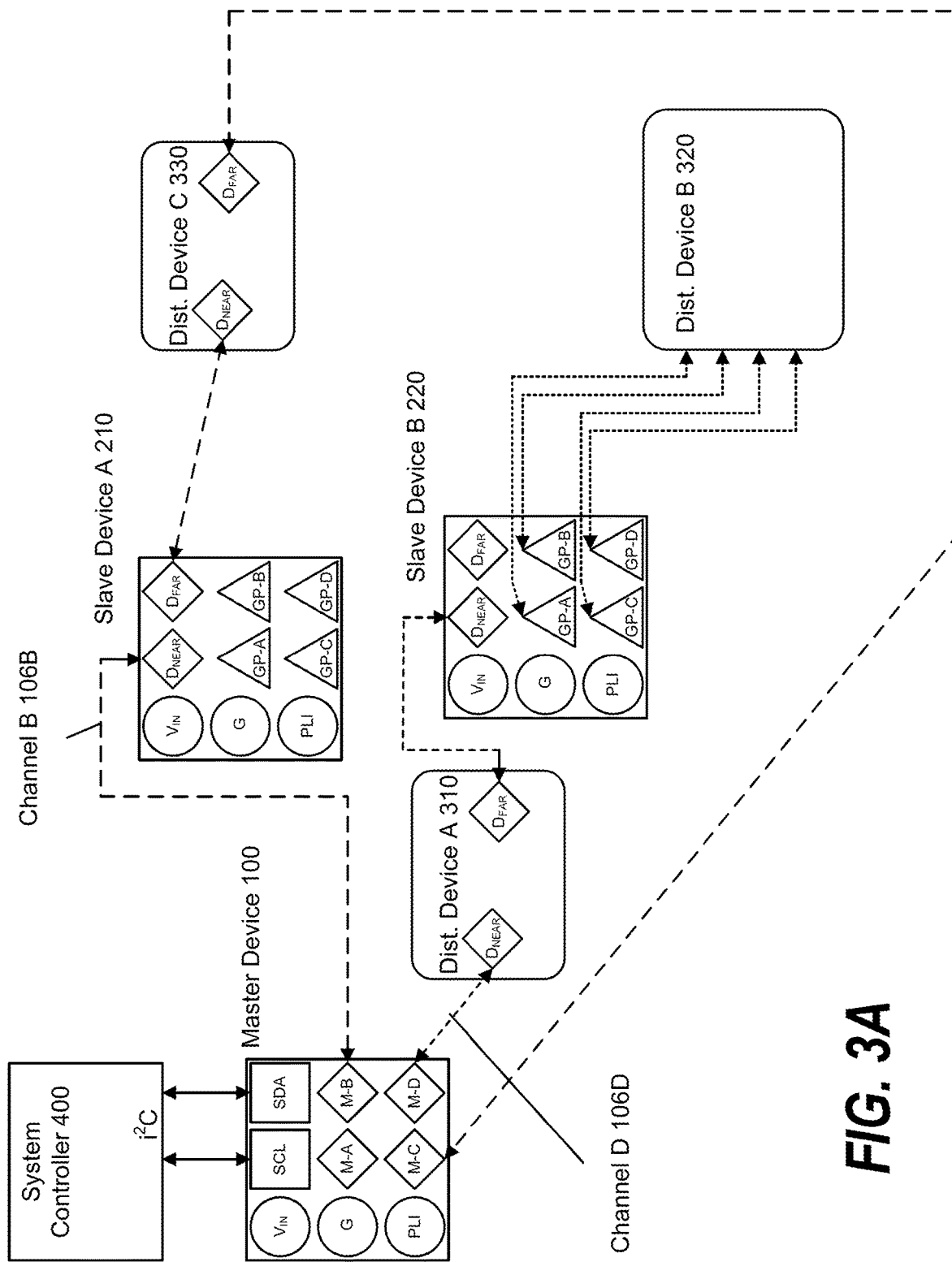
FIGS. 3A-3B illustrate exemplary connections between a master device, slave devices, and distributed devices in accordance with some implementations of the disclosure.

FIG. 3A illustrates exemplary connections between master device 100, slave devices 210, 220, and distributed devices 310, 320, 330. Distributed device A 310 and distributed device C 330 may implement the slave logic. Master Device 100 may communicate with system controller 400 via SCL and SDA of master device 100. SCL and SDA of master device 100 may implement communications using inter-integrated circuit protocol. Master device 100 may communicate with slave device A 210 and/or the slave logic portion of distributed device C 330 on channel B 106B. Master device 100 may communicate with the slave logic portion of distributed device A 310 and/or slave device B 220 on channel D 106D.

Communication from master device 100 to slave device A 210 and/or distributed device C 330 may be sent from a single master channel connector (M-B) of master device 100 to a first slave channel connector ($D_{NEAR}$) of slave device A 210, from a second slave channel connector ($D_{FAR}$) of slave device A 210 to a first slave channel connector ($D_{NEAR}$) of distributed device C 330, and from a second slave channel connector ($D_{FAR}$) of distributed device C 330 to another single master channel connector (M-C) of master device 100, or in reverse order. The dual-pin configuration using two single master channel connectors (M-B and M-C) of master device 100 may provide a loop-back path and/or a return path for channel B 106B.

Communication from master device 100 to distributed device A 310 and/or slave device B 220 may be sent from a single master channel connector (M-D) of master device 100 to a first slave channel connector ($D_{NEAR}$) of distributed device A 310, from a second slave channel connector ($D_{FAR}$) of distributed device A 310 to a first slave channel connector ($D_{NEAR}$) of slave device B 220.

In FIG. 3A, slave device A 210 may not be connected to any distributed devices and may be performing a pass-through function (passing communications between master device 100 and distributed device C 330). Slave device B 220 may be connected to distributed device B 320 via a set of slave input-output connectors (GP-A, GP-B, GP-C, GP-D) of slave device B 220. Connections between the set of slave input-output connectors of slave device B 220 and distributed device B 320 may allow for slave device B 220 to manage operation of distributed device B 320. Slave device B 220 may manage operation of distributed device B 320 based on communications between slave device B 220 and master device 100. Master device 100 may communicate with slave device B 220 based on communications between master device 100 and system controller 400.

Figure 3B:
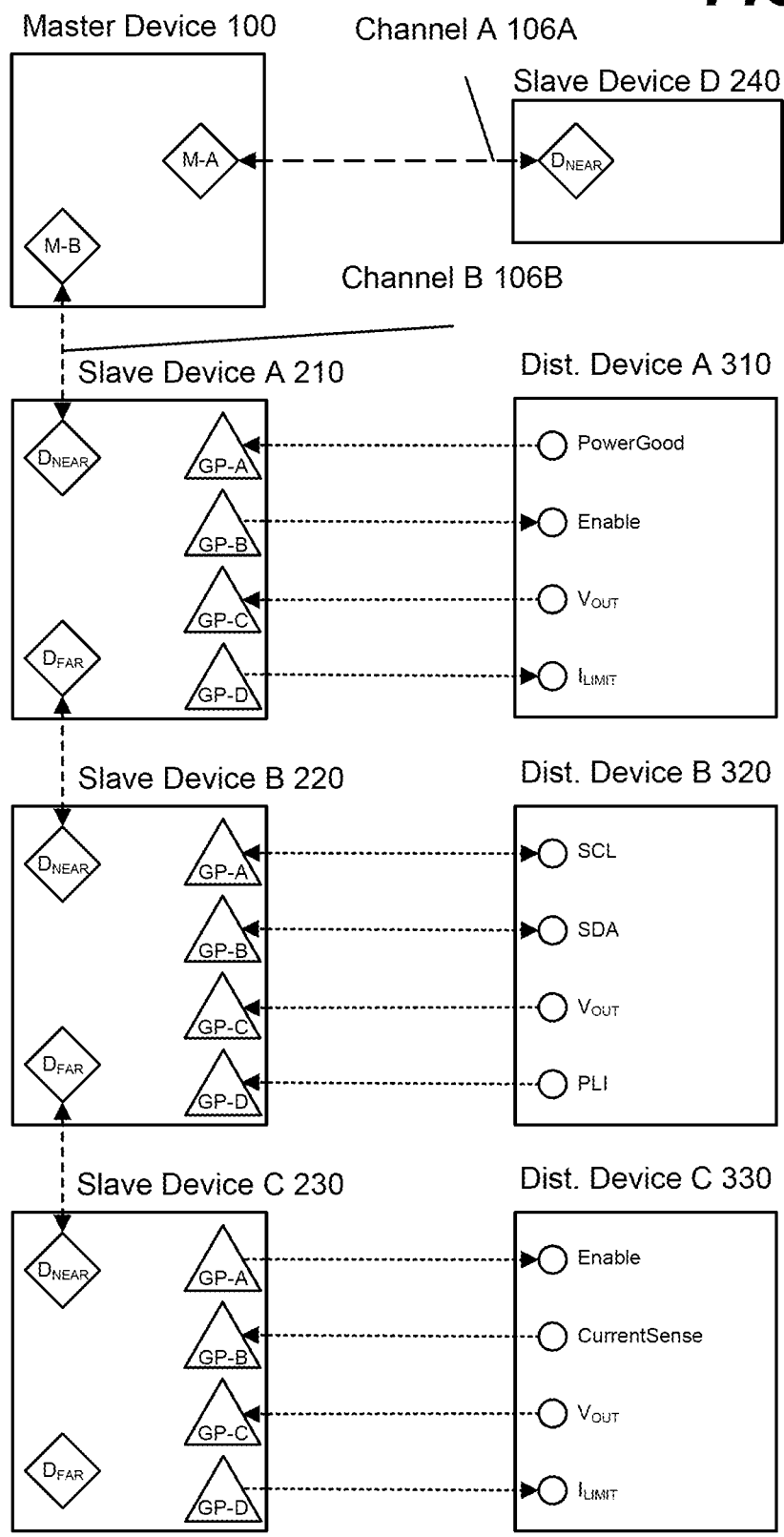

FIG. 3B illustrates exemplary connections between master device 100, slave devices 210, 220, 230, 240, and distributed devices 310, 320, 330. Communications from master device 100 may be sent from a single master channel connector (M-A) of master device 100 to one or more devices connected to channel A 106A. Devices connected to channel A 106A may include slave device D 240, and/or other devices. Communications from master device 100 may be sent from a single master channel connector (M-B) of master device 100 to one or more devices connected to channel B 106B. Devices connected to channel B 106B may include slave device A 210, slave device B 220, slave device C 230, and/or other devices. Slave device A 210 may be connected to distributed device A 310 via a set of slave input-output connectors (GP-A, GP-B, GP-C, GP-D) of slave device A 210. Slave device B 220 may be connected to distributed device B 320 via a set of slave input-output connectors (GP-A, GP-B, GP-C, GP-D) of slave device B 220. Slave device C 230 may be connected to distributed device C 330 via a set of slave input-output connectors (GP-A, GP-B, GP-C, GP-D) of slave device C 230. Other connections between slave devices and distributed devices are contemplated.

Distributed device A 310 may include some or all of the following connectors: PowerGood, Enable, $V_{OUT}$, $I_{LIMIT}$. Distributed device A 310 may include a buck and/or other devices. GP-A of slave device A 210 may receive digital input from PowerGood of distributed device A 310. GP-B of slave device A 210 may send digital output to Enable of distributed device A 310. GP-C of slave device A 210 may receive analog input from $V_{OUT}$ of distributed device A 310. GP-D of slave device A 210 may send analog output to $I_{LIMIT}$ of distributed device A 310. Connections between slave device A 210 and distributed device A 310 may enable master device 100/slave device A 210 to manage operations of distributed device A 310.

Distributed device B 320 may include some or all of the following connectors: SCL, SDA, $V_{OUT}$, PLI. Distributed device B 330 may include a buck and/or other devices. GP-A of slave device B 220 may send/receive clock signal to/from SCL of distributed device B 320. GP-B of slave device B 220 may send/receive data signal to/from SDA of distributed device B 320. GP-C of slave device B 220 may receive analog input from $V_{OUT}$ of distributed device B 320. GP-D of slave device B 220 may receive digital fault input from PLI of distributed device B 320. Connections between slave device B 220 and distributed device B 320 may enable master device 100/slave device B 220 to manage operations of distributed device B 320.

Distributed device C 330 may include some or all of the following connectors: Enable, CurrentSense, $V_{OUT}$, $I_{LIMIT}$. Distributed device C 330 may include an over-voltage protection switch and/or other devices. GP-A of slave device C 230 may send digital output to Enable of distributed device C 330. GP-B of slave device C 230 may receive analog input from CurrentSense of distributed device C 330. GP-C of slave device C 230 may receive analog input from $V_{OUT}$ of distributed device C 330. GP-D of slave device C 230 may send analog output to $I_{LIMIT}$ of distributed device C 330. Connections between slave device C 230 and distributed device C 330 may enable master device 100/slave device C 230 to manage operations of distributed device C 330.

Figure 3C:
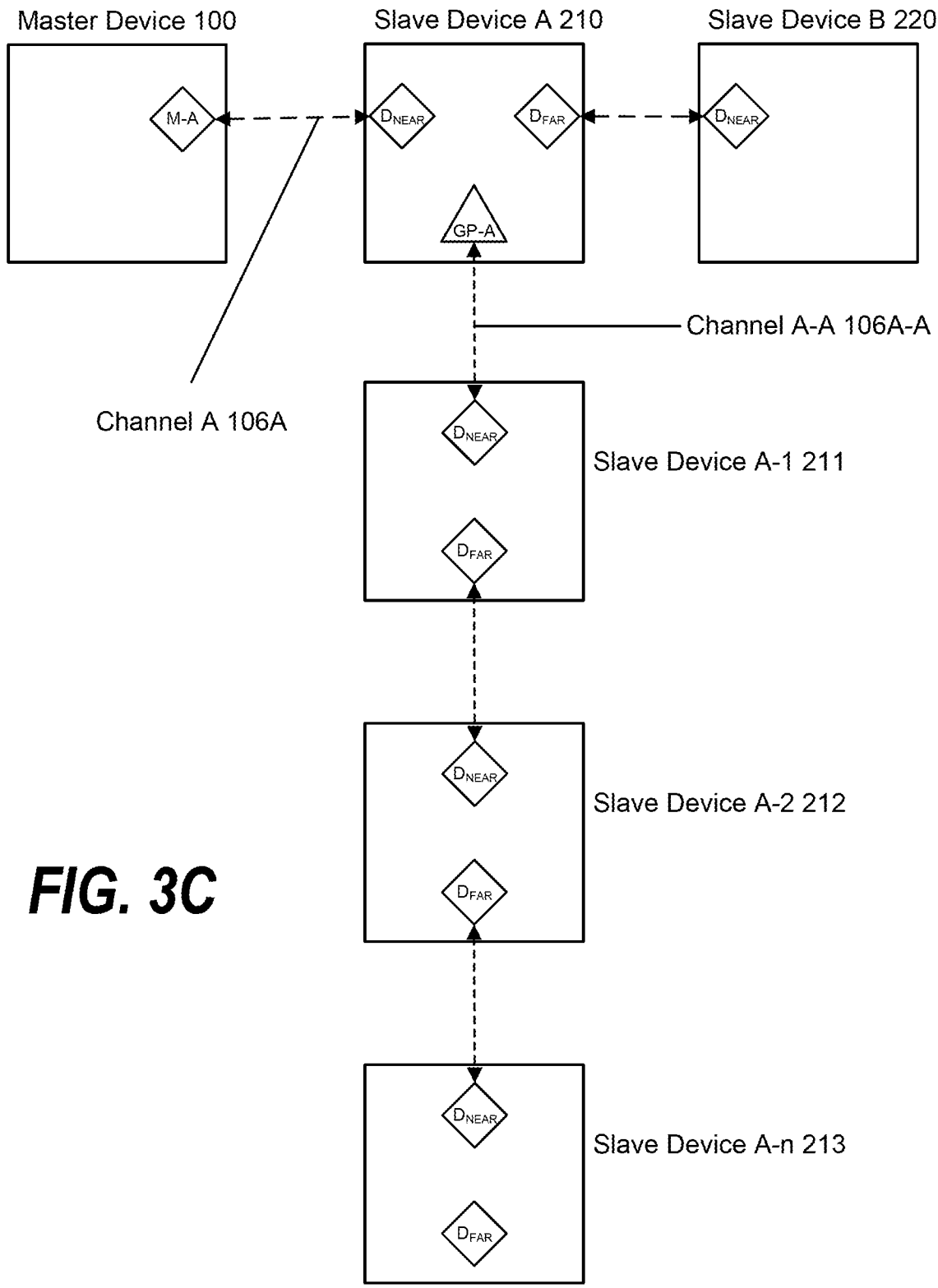
FIG. 3C illustrates an exemplary slave device operating as a virtual master device in accordance with some implementations of the disclosure.

In some implementations, a slave device may operate as a virtual master device. For example, in FIG. 3C, communication from master device 100 to slave device A 210 and/or slave device B 220 may be sent from a single master channel connector (M-A) of master device 100 to a first slave channel connector ($D_{NEAR}$) of slave device A 210, and from a second slave channel connector ($D_{FAR}$) of slave device A 210 to a first slave channel connector ($D_{NEAR}$) of slave device B 220. Slave Device A 210 may be operating as a virtual master device. One or more slave input-output connectors of slave device A 210 (e.g., GP-A) may operate as a virtual single master channel connector of the virtual master device. Communication from slave device A 210 (the virtual master device), which may originate from slave device A 210, master device 100, and/or other devices, may be sent on channel A-A 106A-A including slave device A-1 211, slave device A-2 212, slave device A-n 213, and/or other devices. Channel A-A 106A-A may include communications different from or same as communications on channel A 106A. For example, slave device A 210 may duplicate communications on channel A 106A on channel A-A 106A-A. Channel A-A 106A-A may operate as an extension of channel A 106A. As another example, slave device A 210 may relay communications intended for devices connected to channel A-A 106A-A on channel A-A 106A-A. Channel A-A 106A-A may operate as a sub-channel of channel A 106A.

In some implementations, a slave device may manage operations of two or more distributed devices. For example, a set of slave input-output connectors for a slave device may include sixteen points of connections. The slave device may manage operations of two distributed devices that each require eight points of connections; a first distributed device that requires six points of connections and a second distributed device that requires ten or less points of connections, and/or other combinations of distributed devices that requires a total of less than or equal to sixteen points of connections.

In some implementations, multiple slave devices may manage operations of a single distributed device. For example, two slave device may each include a set of slave input-output connectors including eight points of connections. The two slave devices may operations of a single distributed device that requires more than eight points of connection and less than or equal to sixteen points of connections. Other combinations of slave devices and distributed devices are contemplated.

Figure 4A:
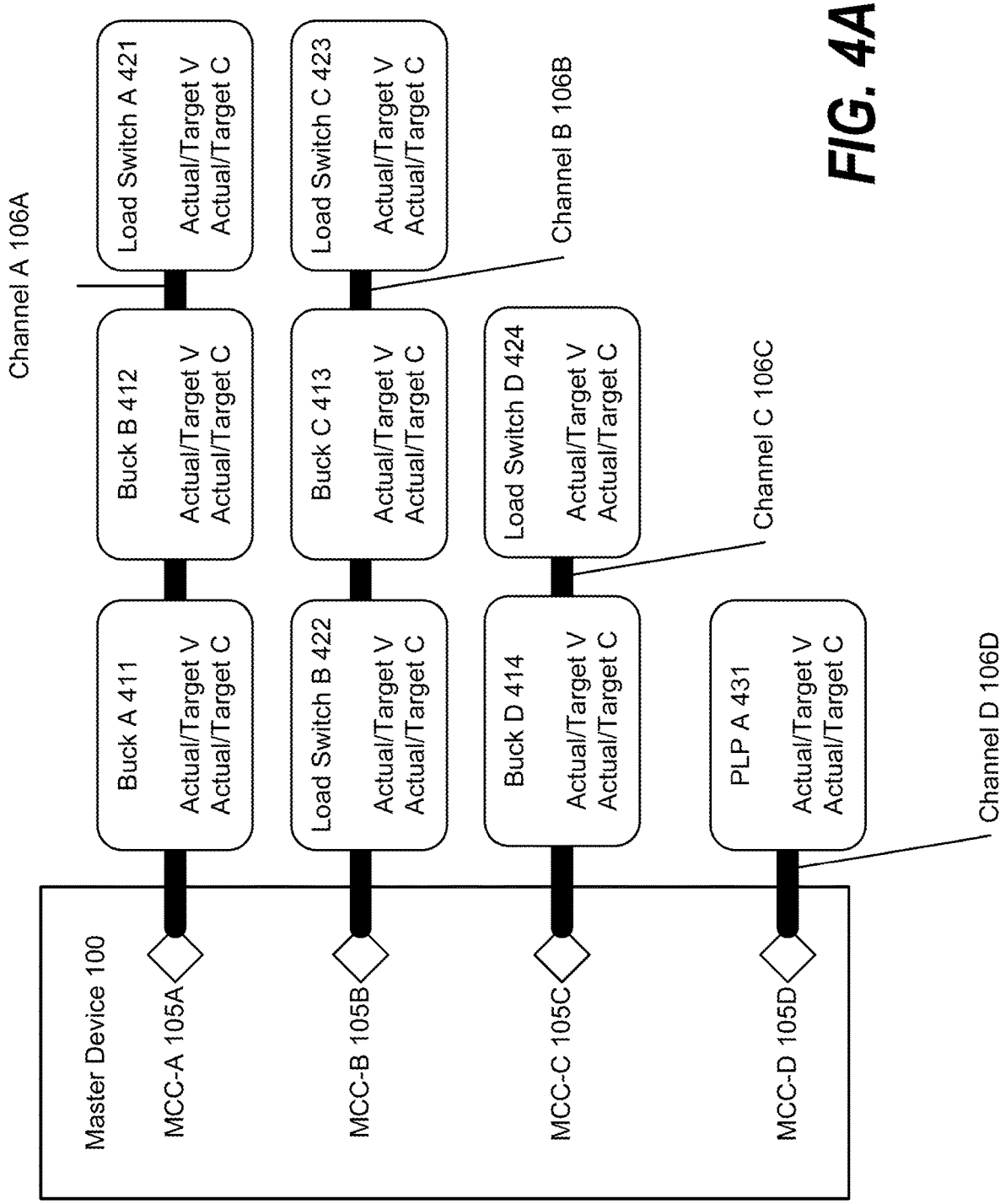
FIG. 4A illustrates an exemplary block diagram showing management of distributed devices via a master device in accordance with some implementations of the disclosure.

FIG. 4A illustrates an exemplary block diagram showing management of distributed devices via master device 100 and slave devices (not shown in FIG. 4A). Master device 100 may communicate with one or more slave devices on channel A 106A via a single master channel connector (MCC-A 105A) of master device 100. Master device 100 may communicate with one or more slave devices on channel B 106B via a single master channel connector (MCC-B 105B) of master device 100. Master device 100 may communicate with one or more slave devices on channel C 106C via a single master channel connector (MCC-C 105C) of master device 100. Master device 100 may communicate with one or more slave devices on channel D 106D via a single master channel connector (MCC-D 105D) of master device 100.

One or more slave devices on channel A 106A may manage operations of one or more distributed devices (e.g., Buck A 411, Buck B 412, Load Switch A 421). One or more slave devices on channel B 106B may manage operations of one or more distributed devices (e.g., Load Switch B 422, Buck C 413, Load Switch C 423). One or more slave devices on channel C 106C may manage operations of one or more distributed devices (e.g., Buck D 414, Load Switch D 424). One or more slave devices on channel D 106D may manage operations of one or more distributed devices (e.g., PLP A 431).

Managing operations of the distributed devices may include monitoring and/or controlling the operations of the distributed devices. For example, master device 100 may communicate with one or more slave devices to control the target voltage and/or target current of one or more distributed devices 411, 412, 413, 414, 421, 422, 423, 424, 431. Master device 100 may communicate with one or more slave devices to monitor the actual voltage and/or actual current of one or more distributed devices 411, 412, 413, 414, 421, 422, 423, 424, 431. As non-limiting examples, master device 100 may communicate with one or more slave devices to control/monitor power levels of distributed devices, brightness/color of distributed devices (e.g. lighting devices), voltage output/input of distributed devices, current output/input of distributed devices, AC-DC conversion by distributed devices, communication between distributed devices, load of distributed devices, temperature of distributed devices, fault reporting by distributed devices, and/or other operating parameters of distributed devices. Other controls and/or monitoring of distributed devices are contemplated.

There may be a time delay between monitoring and control of distributed devices. For example, a slave device may send a first signal to a distributed device via one or more connections between the slave device and the distributed device, and may receive a second signal from the distributed device via the one or more connections. There may be a time delay between the slave device's sending of the first signal and reception of the second signal. The time delay may allow for the distributed device to change its operation based on the first signal before sending the second signal.

Figure 4B:
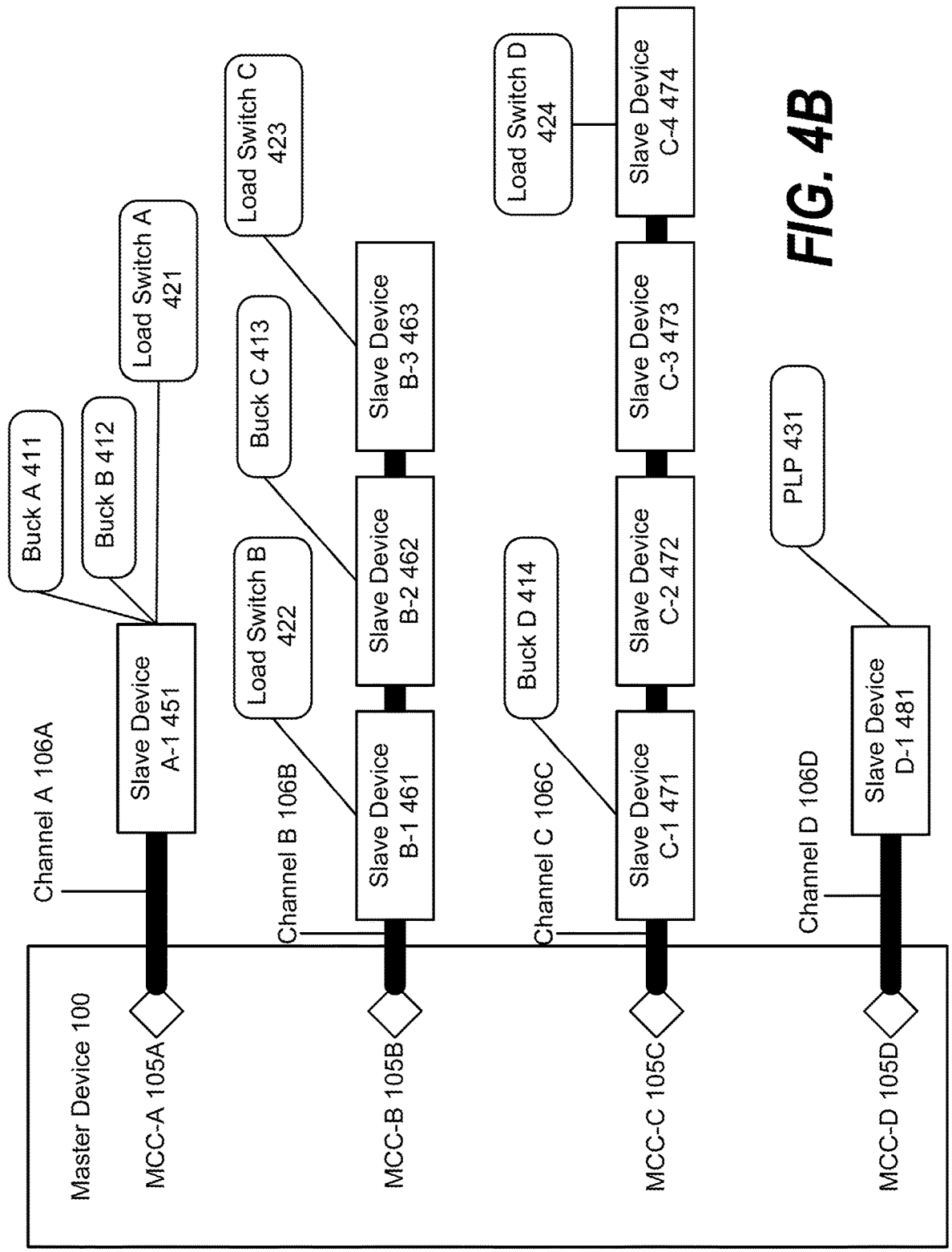
FIG. 4B illustrates exemplary connections between a master device, slave devices, and distributed devices for block diagram shown in FIG. 4A.

In some implementations, the numbers of slave devices and/or distributed devices connected to a channel and/or a master device may be used to provide encryption. For example, FIG. 4B illustrates exemplary connections between master device 100, slave devices 451, 461, 462, 463, 471, 472, 473, 474, 481, and distributed devices 411, 412, 413, 414, 421, 422, 423, 424, 431 for block diagram shown in FIG. 4A. Channel A 106A may include slave device A-1 451 connected to three distributed devices 411, 412, 421. Channel B 106B may include slave device B-1 461 connected to one distributed device 422, slave device B-2 462 connected to one distributed device 413, and slave device B-3 463 connected to one distributed device 423. Channel C 106C may include slave device C-1 471 connected to one distributed device 414, slave device C-2 472 not connected to any distributed devices, slave device C-3 473 not connected to any distributed devices, and slave device C-4 474 connected to one distributed device 424. Channel D 106D may include slave device D-1 481 connected to one distributed device 431. Encryption for access and/or use of master device 100 may be contingent on a user providing a correct passcode and/or other information.

The passcode may be based on the number of slave devices and/or distributed devices connected to master device 100. For example, the passcode may include and/or may be derived from digits 1-3-4-1 (number of slave devices connected to individual channels of master device 100). The passcode may include and/or may be derived from digits 3-3-2-1 (number of distributed devices connected to individual channels of master device 100). The passcode may include and/or may be derived from digits based on numbers of slave devices and numbers of distributed devices (e.g., 1-3-3-3-4-2-1-1). The passcode and/or digits from which passcode is derived may depend on whether distributed devices are connected to slave devices. For example, the passcode may include and/or may be derived from digits 1-3-2-1 (number of slave devices that are connected to distributed devices). Other combinations of numbers of slave devices and/or distributed devices connected to a channel and/or a master device may be used to provide encryption.

Figure 5:
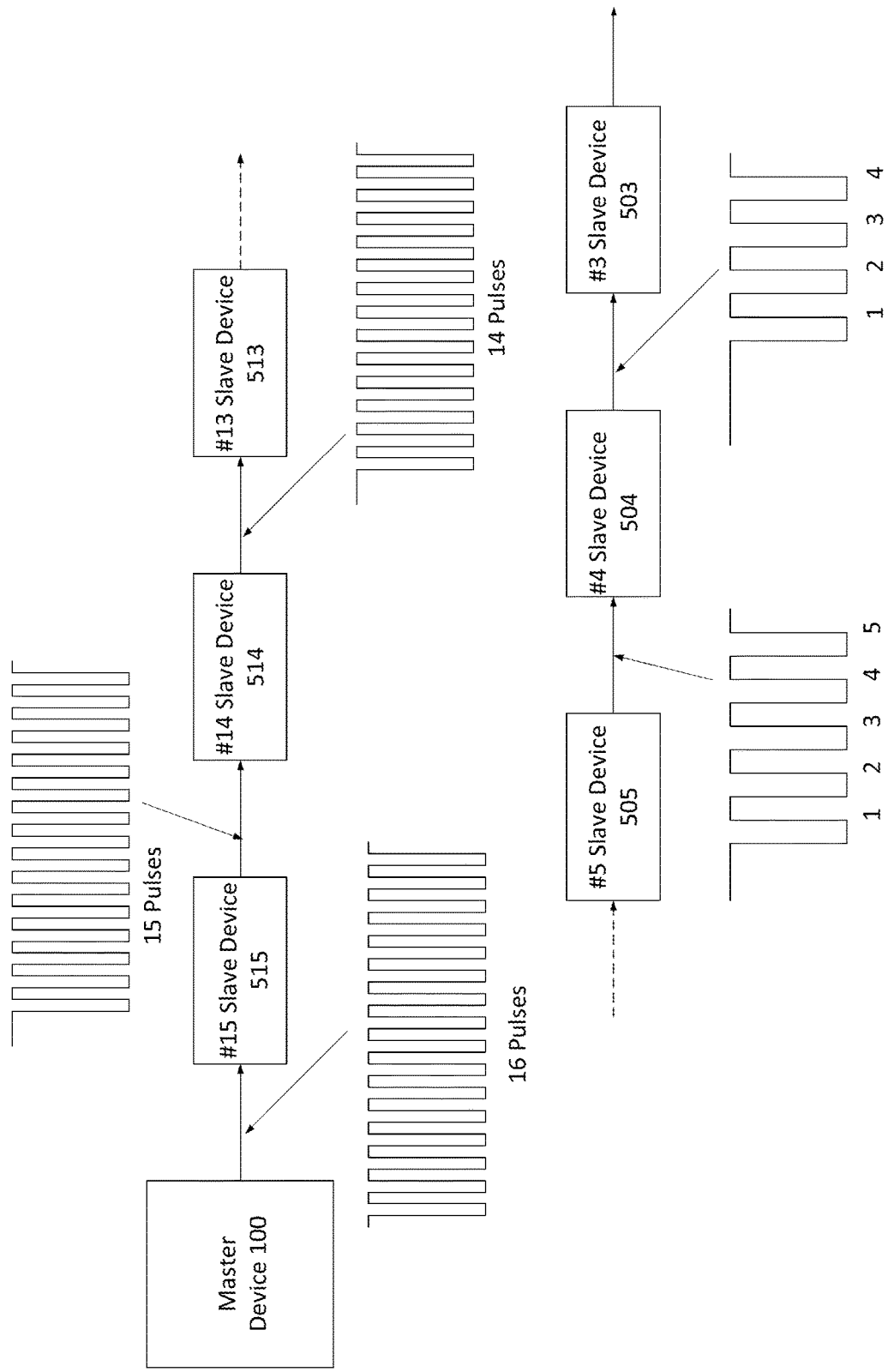
FIG. 5 illustrates exemplary pulse shaving used to determine addresses of slave devices in accordance with some implementations of the disclosure.

In some implementations, one or more addresses of slave devices may be determined based on pulse shaving. Pulse shaving may determine the addresses of slave devices based on a number of pulses counted by the slave devices. FIG. 5 illustrates exemplary pulses sent down a channel. In FIG. 5, a single channel may include fifteen slave devices (e.g., slave devices #1-15). As another example, the single channel shown in FIG. 5 may include sixteen slave devices (e.g., slave devices #0-15). Master device 100 may send out sixteen pulses on the channel. #15 slave device 515 may shave off a pulse, count the remaining fifteen pulses, and send fifteen pulses down the channel. #14 slave device 514 may shave off a pulse, count the remaining fourteen pulses, and send fourteen pulses down the channel. The pulses may be subsequently shaved and counted by individual slave devices until #1 slave device (not shown) shaves off a pulse and counts one pulse. Individual slave devices may determine its address/location in the channel based on the number of pulses counted by it. For example, #15 slave device may determine its address/location in the channel based on the fifteen pulses counted by #15 slave device 515. In some implementations, the pulses may be counted by the slave devices before a pulse is shaved off.

Pulse shaving may allow for position-oriented addressing of slave devices on a channel—i.e., addresses of slave devices on a channel are determined based on locations of the slave devices in the channel. The use of pulse shaving may allow for addressing of multiple devices using a single connector rather than multiple connectors. In some implementations, pulse-shaved addressing on a channel may be effectuated using communications implemented via the open-gate configuration. Connections between slave devices may be established as the shaved pulses are relayed down a channel. The connections between the slave devices may remain established after the shaved pulses are relayed down the channel. In such a case, the pulse shaving on the channel may be communicated via the open-gate configuration and subsequent signals on the channel may be communicated via the closed-gate configuration.

In some implementations, pulse adding may be used to determine addresses of slave devices in a channel. In pulse adding, individual slave devices may receive pulse(s) from a preceding device, add a pulse, count the pulses, and send the pulses to the next device. In some implementations, the pulses may be counted by the slave devices before a pulse is added. Other methods of addressing may be used to determine addresses of slave devices in a channel.

In some implementations, pulse shaving (or adding) may be used to confirm the configuration of slave devices connected to a channel. For example, pulse shaving may be used on power up to determine the number of slave devices on a channel, and may at a later time be used to confirm that the same number of slave devices are connected to the channel. A difference in the number of slave devices detected via pulse shaving (or adding) may indicate a change in the system and/or a loss of connection to one or more slave devices.

Master device 100 and slave devices (e.g., slave device A 210, slave device B 220) may include a power loss interrupt connector (e.g., PLI 103, PLI 213). A PLI may provide an unmasked interrupt signal in response to a power loss on a master device 100 or a slave device 210, 220. A PLI may fail high, and a device that loses power may use the fail signal from PLI for a brown-out ride through the power loss. Use of the fail signal from PLI may enable the device that loses power to maintain some or all of its operating status and/or allow the device to return to a known state when power is restored, i.e., the device does not reset its state on power loss. In some implementations, one or more PLIs may be connected to other PLIs. For example, PLI 103 of master device 100 maybe connected to PLI 213 of slave device A 210. On power loss, master device 100 and/or slave device A 210 may use fail signal(s) from PLI 103 and/or PLI 213.

One or more devices in system 10 may use main power ($V_{CC\_MAIN}$) and auxiliary power ($V_{CC\_AUX}$). In some implementations, PLI fail signal may provide auxiliary power for one or more devices in system 10. Main power may be higher, the same as, or lower than auxiliary power. As non-limiting examples, main voltages may include 3.3V, 5V, 9V, 12V, 20V, 33V, 40V, 48V, ranges of voltages and/or other voltages. As non-limiting examples, auxiliary voltages may include 2.5V, 3.3V, 5V, 12V, 33V, 40V, 48V, ranges of voltages, or other voltages. In some implementations, system 10 may boost lower auxiliary voltages to provide higher main voltages. In some implementations, system 10 may buck higher auxiliary voltages to provide lower main voltages. In some implementations, system 10 may provide for switching between main power, auxiliary power, and/or other power for delivery of power to one or more devices. Switching between different power sources may allow system 10 to reduce the amount of power loss in delivery.

Figure 6:
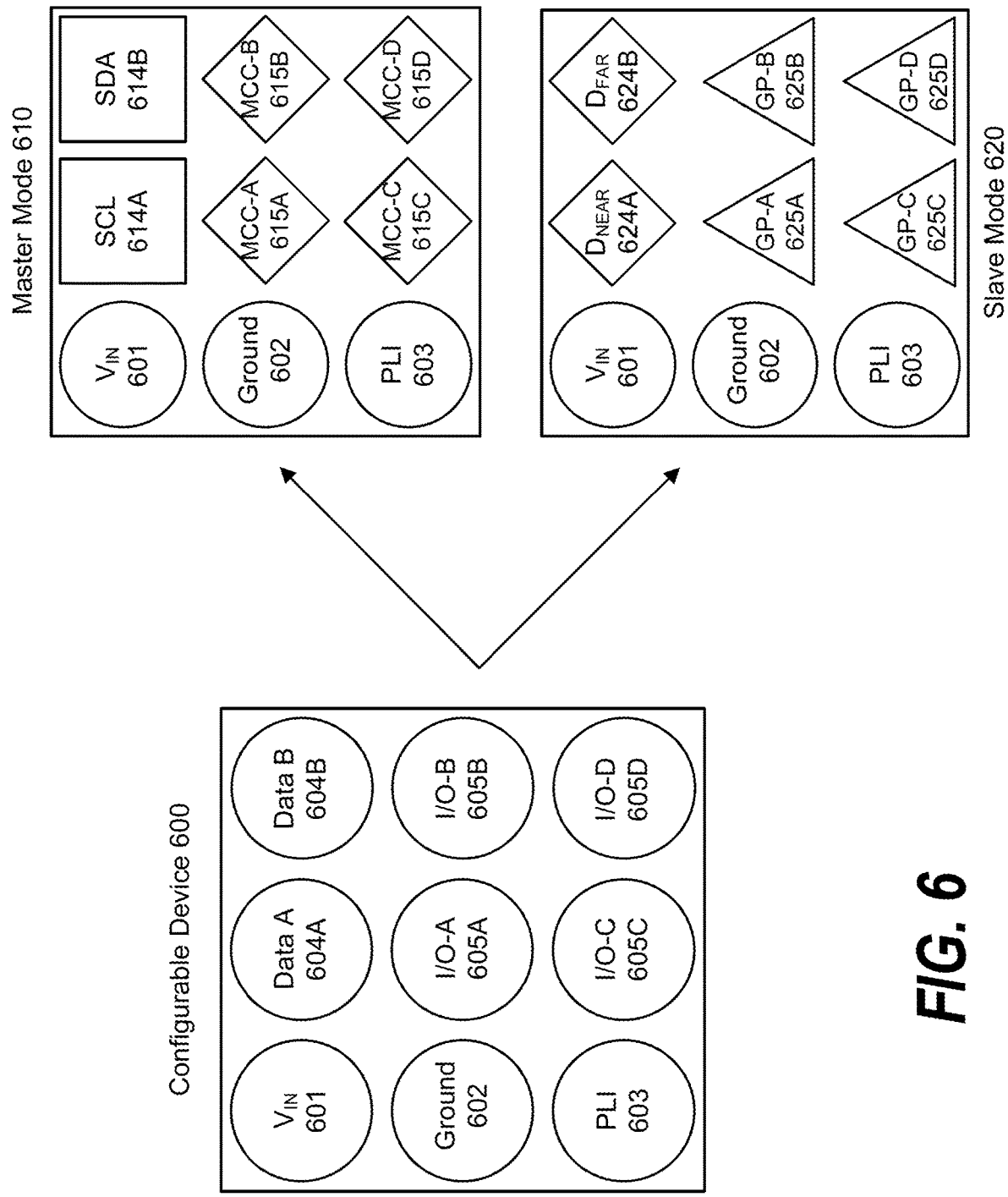
FIG. 6 illustrates an exemplary configurable device, a master mode, and a slave mode in accordance with some implementations of the disclosure.

FIG. 6 illustrates an exemplary configurable device 600 for managing power on distributed devices. Configurable device 600 may include the master logic, the slave logic, and/or other logics. Configurable device 600 may include some or all of the following connectors: $V_{IN}$ 601, Ground 602, PLI 603, a set of data connectors 604 (e.g., Data A 604A, Data B 604B), a set of input/output connectors 605 (e.g., I/O-A 605A, I/O-B 605B, I/O-C 605C, I/O-D 605D). Configurable device 600 may include other connectors. Configurable device 600 may include other components not shown in FIG. 6. For example, configurable device 600 may include one or more of a processor, a memory (volatile and/or non-volatile), internal and external connections, and/or other components.

Configurable device 600 may be configured in a master mode, a slave mode, or other modes. In some implementations, configurable device 600 may be reconfigurable between the master mode and the slave mode. In some implementations, configurable device 600 may be configurable once in the master mode or the slave mode, i.e., configurable device 600 may be one-time programmable.

The master mode may enable configurable device 600 to use the set of data connectors 604 (e.g., Data A 604A, Data B 604B) as a set of master data connectors 614 (e.g., SCL 614A, SDA 614B). The master logic may enable configurable device 600 configured in the master mode to communicate with a processor. Configurable device 600 configured in the master mode may communicate with the processor via a set of master data connectors 614 (e.g., SCL 614A, SDA 614B).

The master mode may enable configurable device 600 to use the set of input/output connectors 605 (e.g., I/O-A 605A, I/O-B 605B, I/O-C 605C, I/O-D 605D) as a set of single master channel connectors 615 (e.g., MCC-A 615A, MCC-B 615B, MCC-C 615C, MCC-D 615D). The master logic may enable configurable device 600 configured in the master mode to communicate with multiple devices on one or more channels. The multiple devices may have the slave logic. Configurable device 600 configured in the master mode may communicate with one or more devices having the slave logic on a single channel via a single master channel connector 615 (e.g., MCC-A 615A, MCC-B 615B, MCC-C 615C, MCC-D 615D) of configurable device 600.

The slave mode may enable configurable device 600 to use the set of data connectors 604 (e.g., Data A 604A, Data B 604B) as a set of slave channel connectors 624 (e.g., $D_{NEAR}$ 624A, $D_{FAR}$ 624B). The slave logic may enable configurable device 600 configured in the slave mode to communicate with a master device having the master logic and communicate with a slave device having the slave logic on a single channel. Configurable device 600 configured in the slave mode may communicate with the master device on the single channel via $D_{NEAR}$ 624A of configurable device 600. Configurable device 600 configured in the slave mode may communicate with the slave device on the single channel via $D_{FAR}$ 624B of configurable device 600.

The slave mode may enable configurable device 600 to use the set of input/output connectors 605 (e.g., I/O-A 605A, I/O-B 605B, I/O-C 605C, I/O-D 605D) as a set of slave input-output connectors 625 including four points of connections (e.g., GP-A 625A, GP-B 625B, GP-C 625C, GP-D 625D). The slave logic may enable configurable device 600 configured in the slave mode to manage operations of one or more distributed devices. Configurable device 600 configured in the slave mode may manage operations of one or more distributed devices via one or more slave input-output connectors 625 of configurable device 600.

The number of connectors shown in FIG. 6 are illustrative and not limiting. For example, configurable device 600 may include more or less data connectors 604, more or less input/output connectors 605, more or less master data connector 614, more or less single master channel connectors 615, more or less slave channel connectors 624, and/or more or less slave input-output connectors 625.

Figure 7:
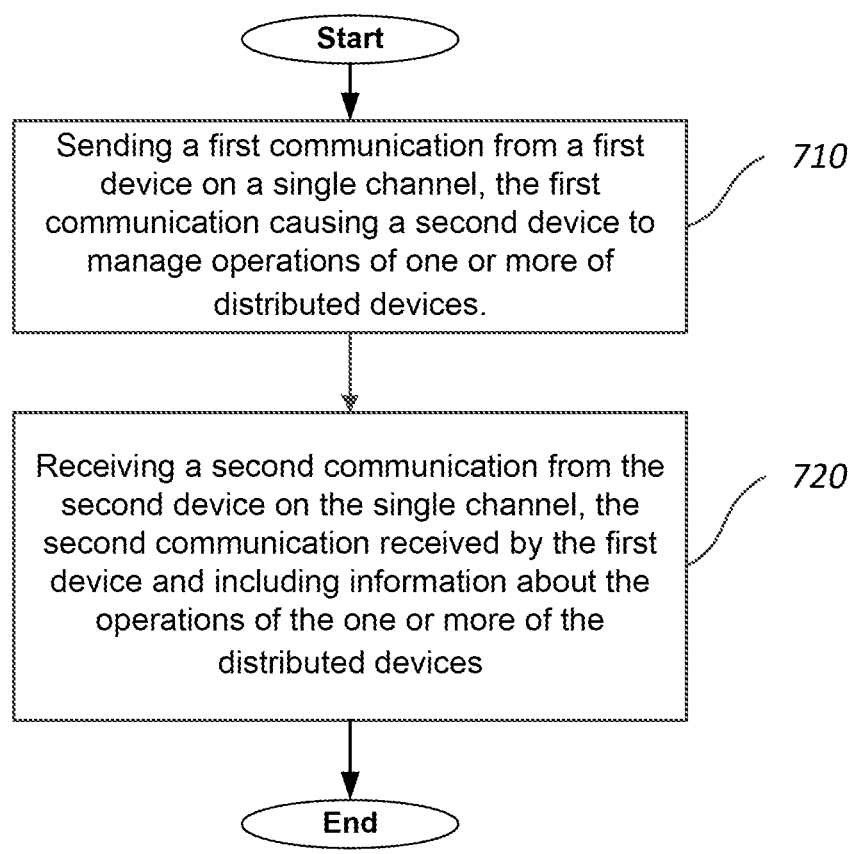
FIG. 7 illustrates a method for managing power on distributed devices in accordance with some implementations of the disclosure.

FIG. 7 illustrates method 700 for managing power on distributed devices. The operations of method 700 presented below are intended to be illustrative. In some implementations, method 700 may be accomplished with one or more additional operations not described, and/or without one or more of the operations discussed. In some implementations, two or more of the operations may occur substantially simultaneously.

At operation 710, a first communication from a first device may be sent on a single channel. The first device may have a master logic and may send the first communication via a single master channel connector of the first device. The master logic may enable the first device to communicate with multiple devices on one or more channels. The multiple devices may have a slave logic. The multiple devices may include a second device and a third device. The slave logic may enable the second device to communicate with the first device on the single channel via a first slave channel connector of the second device and communicate with the third device on the single channel via a second slave channel connector of the second device. The first communication may cause the second device to manage operations of one or more distributed devices via one or more slave input-output connectors of the second device.

At operation 720, a second communication from the second device on the single channel may be received. The second communication may be received by the first device. The second communication may include information about the operations of the one or more distributed devices.

In some implementations, operations and structure of the first device may be the same as or similar to master device 100 (shown in FIGS. 1A and 2A and described herein). In some implementations, operations and structure of the second device and the third device may be the same as or similar to slave device A 210 (shown in FIGS. 1A and 2B and described herein).

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A first slave device comprising:
   a first slave channel connector;
   a second slave channel connector;
   a third slave channel connector; and
   slave logic enabling the first slave device to:
      exchange clockless communication with a second slave device on a single channel over a wired serial connection via the first slave channel connector,
      exchange clockless communication with a third slave device on the single channel over the wired serial connection via the second slave channel connector, and
      exchange clockless communication with a master device on the single channel over the wired serial connection via the third slave channel connector.

2. The first slave device of claim 1, wherein the third slave channel connector enables connection of the first slave device with a master channel connector of the master device.

3. The first slave device of claim 1, further comprising:
   multiple slave-input-output connectors, wherein the multiple slave-input-output connectors enable connection of the first slave device with one or more distributed devices.

4. The first slave device of claim 3, wherein the multiple slave-input-output connectors include up to four, eight, sixteen, thirty-two, or sixty-four points of connections.

5. The first slave device of claim 3, wherein the slave logic further enables the first slave device to manage operations of the one or more distributed devices via one or more of the multiple slave input-output connectors.

6. The first slave device of claim 3, wherein the slave logic further enables the first slave device to send or receive an analog signal via the one or more of the multiple slave input-output connectors.

7. The first slave device of claim 3, wherein the slave logic further enables the first slave device to send or receive a digital signal via the one or more of the multiple slave input-output connectors.

8. The first slave device of claim 3, wherein the distributed devices include a power device.

9. The first slave device of claim 8, wherein the first slave device is a part of the power device.

10. The first slave device of claim 1, wherein the first slave device determines an address of the first slave device using pulse shaving.

11. The first slave device of claim 10, wherein the first slave device:
   receives a pulse string comprising one or more pulses;
   determines an address of the first slave device based on a number of pulses in the pulse string;
   modifies the pulse string by removing one of the pulses from the pulse string; and
   sends the modified pulse string.

12. The first slave device of claim 10, wherein the first slave device:
   receives a pulse string comprising one or more pulses;
   modifies the pulse string by removing one of the pulses from the pulse string;
   determines an address of the first slave device based on a number of pulses in the modified pulse string; and
   sends the modified pulse string.

13. The first slave device of claim 1, wherein the first slave device determines an address of the first slave device using pulse adding.

14. The first slave device of claim 13, wherein the first slave device:
  receives a pulse string comprising one or more pulses;
  determines an address of the first slave device based on a number of pulses in the pulse string;
  modifies the pulse string by adding a pulse to the pulse string; and
  sends the modified pulse string.

15. The first slave device of claim 13, wherein the first slave device:
  receives a pulse string comprising one or more pulses;
  modifies the pulse string by adding a pulse to the pulse string;
  determines an address of the first slave device based on a number of pulses in the modified pulse string; and
  sends the modified pulse string.

16. A method performed by a slave device having a first slave channel connector, a second slave channel connector, and a third slave channel connector, the method comprising:
  receiving, via the first slave channel connector, a pulse string comprising one or more pulses on a single channel over a wired serial connection from a second slave device, the first slave channel connector connected to a daisy-chain connection;
  modifying the pulse string by adding a pulse to the pulse string;
  determining an address of the slave device based on a number of pulses in the pulse string before or after modifying the pulse string; and
  sending the modified pulse string on the single channel over the wired serial connection via the second slave channel connector to a third slave device,
  wherein the slave device exchanges clockless communication with a master device on the single channel via the third slave channel connector.

17. A method performed by a slave device having a first slave channel connector, a second slave channel connector, and a third slave channel connector, the method comprising:
  receiving, via the first slave channel connector, a pulse string comprising one or more pulses on a single channel over a wired serial connection from a second slave device, the first slave channel connector connected to a daisy-chain connection;
  modifying the pulse string by removing one of the pulses from the pulse string;
  determining an address of the slave device based on a number of pulses in the pulse string before or after modifying the pulse string; and
  sending, via the second slave channel connector, the modified pulse string on the single channel over the wired serial connection to a third slave device,
  wherein the slave device exchanges clockless communication with a master device on the single channel via the third slave channel connector.

* * * * *